Sept. 22, 1959  A. W. KRISTENSEN  2,905,506
PNEUMATIC UNLOADING DEVICES
Filed Dec. 31, 1956  2 Sheets-Sheet 1
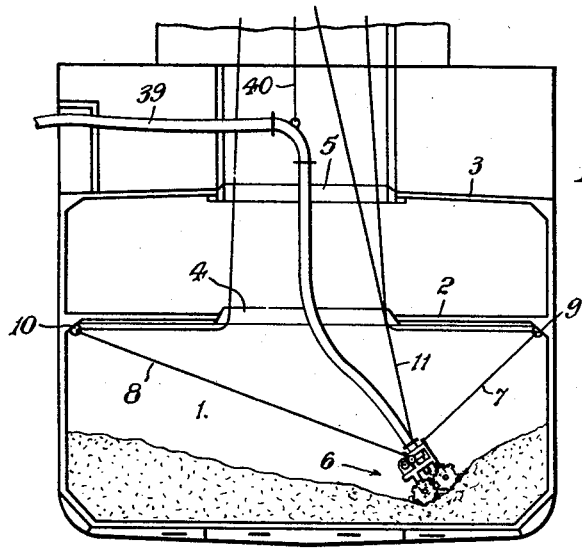
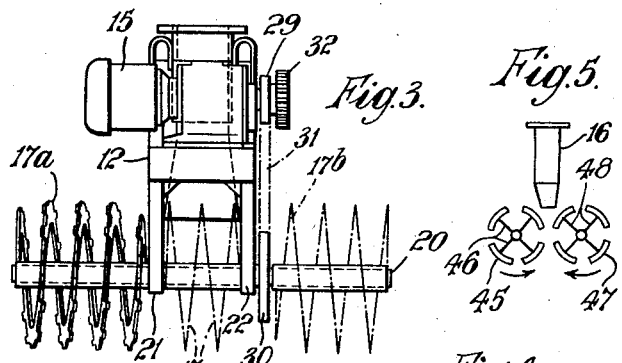
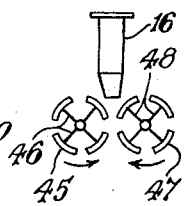
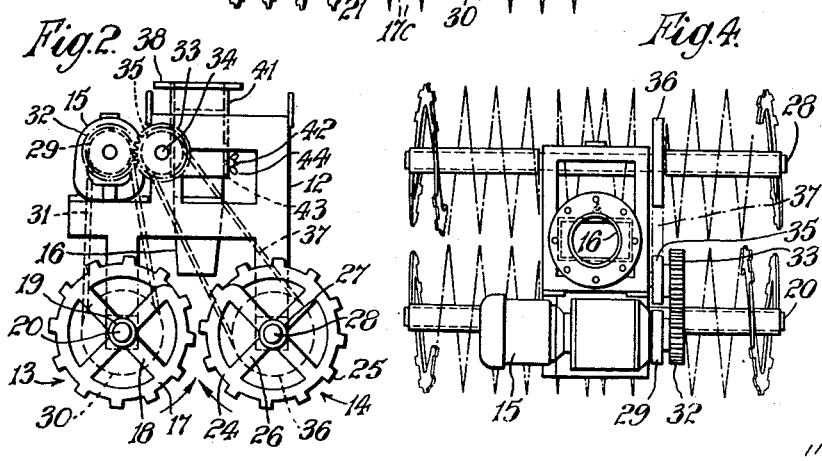
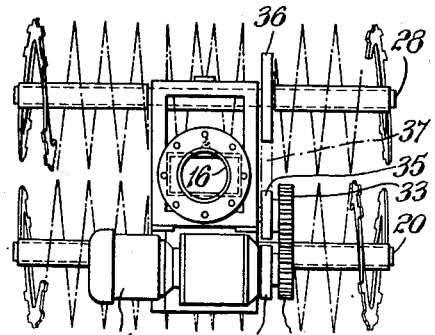
INVENTOR
ARTHUR WILHELM KRISTENSEN
his Attorneys Sept. 22, 1959 A. W. KRISTENSEN 2,905,506
PNEUMATIC UNLOADING DEVICES
Filed Dec. 31, 1956 2 Sheets-Sheet 2

INVENTOR.
ARTHUR WILHELM KRISTENSEN
BY
his ATTORNEYS.

United States Patent Office 2,905,506
Patented Sept. 22, 1959

2,905,506

PNEUMATIC UNLOADING DEVICES

Arthur Wilhelm Kristensen, Fredrikstad, Norway, assignor to Unilever N.V., Rotterdam, Netherlands, a company of the Netherlands Application December 31, 1956, Serial No. 631,877

7 Claims. (Cl. 302—58)

This invention relates to pneumatic unloading devices.

The speed of pneumatic unloading of bulk cargoes is dependent not only on the handling capacity of the pneumatic plant but also on the consistency of the material being unloaded. Thus, though it is easy to pneumatically unload free flowing materials such as grain, linseed and soya beans, considerable difficulties are experienced when pneumatically unloading material which has a tendency to pack together, such as coal or copra.

This invention is particularly concerned with the pneumatic unloading of materials which have a tendency to pack and will hereinafter be described in connection with the unloading of copra.

Copra in particular has a tendency to pack together and to "build"; consequently, after a long period of transport at sea, the copra is frequently packed so closely together that the whole cargo must laboriously be hacked loose prior to unloading. Under such conditions the capacity of the pneumatic unloading plant will be substantially reduced because the speed of unloading is primarily dependent upon how much copra the stevedores in the hold can hack loose and transport to the suction nozzle. As the hacking loose of copra is very heavy work and as the number of men who can work simultaneously at the nozzle is limited, the capacity of the pneumatic unloading plant can in such cases be so low that it does not exceed the capacity of ordinary unloading with baskets or tubs.

It is an object of the present invention to provide means for enabling the pneumatic unloading of material without the use of manual labour in the hold of cargo boats.

It is a further object of the present invention to provide means for loosening the material and conveying the loosened material to the suction nozzle.

It is another object of the present invention to convey material to the suction nozzle in such a manner that the material is presented evenly to the nozzle opening thereby reducing air consumption.

The present invention therefore provides a pneumatic unloading device comprising a pair of parallelly disposed cutter screw conveyors, each cutter screw conveyor having a left hand threaded part and a right hand threaded part, the left hand threaded part of one cutter screw conveyor being adjacent to the right hand threaded part of the other cutter screw conveyor, means for rotating the cutter screw conveyors in opposite directions, and a suction nozzle disposed with its opening substantially over the centre of the area between the cutter screw conveyors where the change of thread direction occurs, so that on rotation of the cutter screw conveyors the material is transported towards the nozzle.

It will be evident that the cutter screw conveyors can take several forms. Each cutter screw conveyor may, for example, be in the form of a solid screw or in the form of a helical strip secured to a shaft or boss by spokes. The cutter screw conveyor can also be in the form of a plurality of radial members secured to the shaft or boss and so positioned and inclined that on rotation of the shaft the material is transported towards the nozzle. The radial members may, for example, be in the form of helically inclined arch shaped plates.

The invention will now be described with reference to the accompanying drawing in which Fig. 1 shows schematically a section of a cargo boat being unloaded by the pneumatic unloading device.

Fig. 2 shows a schematic end view of the device.

Fig. 3 shows a schematic side view of the device shown in Fig. 2.

Fig. 4 shows a schematic plan view of the device shown in Fig. 2.

Fig. 5 shows schematically an end view of a variation of the cutter screw conveyors shown in Figs. 1–4.

Figure 6:
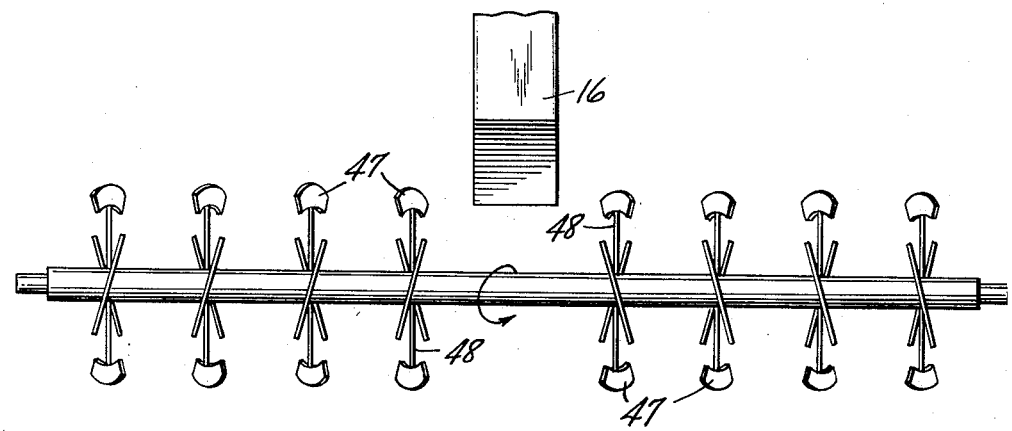
Fig. 6 illustrates schematically a side view of the conveyors shown in Fig. 5.

Referring to Fig. 1, the cargo boat has a lower hold 1 containing a cargo of copra which has been partly unloaded. The boat has a tween deck 2 and main deck 3 provided with hatches 4 and 5 respectively.

The pneumatic unloading device designated by the reference numeral 6 is shown attached to wires 7 and 8 which pass over snatch blocks 9 and 10 respectively. The snatchblocks are situated under the tween deck 2 near the walls of the hold. Although only two wires have been shown, four wires are used, the snatchblocks for the wires being arranged in the four upper corners of the hold. The wires pass upwards through the hatches to one or more winches (not shown). By means of the wires 7, 8 and the two wires not shown, the unit 6 can be pulled backwards and forwards over the cargo. Thus the primary purpose of the four wires is to position the unit 6. A further wire 11, one end of which is attached to the unit 6, the other end being attached to a winch (not shown), serves to sustain the greater part of the weight of the unit 6 and for raising and lowering it.

Referring now to Figs. 2–4, the pneumatic unloading device 6 has a frame 12, a pair of cutter screw conveyors 13, 14, an electric motor 15 for rotating the screw conveyors, and a suction nozzle 16.

The cutter screw conveyor 13 is in the form of a helical strip of metal 17 attached by spokes 18 to a tubular boss 19 which is secured to a shaft 20. Shaft 20 is journalled in bearings 21, 22 mounted in frame 12. The width of the strip is along a substantially radial direction and the periphery of the strip is provided at regular intervals with projections 23.

The strip 17 is in three sections. Section 17a, which is situated to the left of bearing 21, has a left hand thread; section 17b, which is situated to the right of bearing 22, has a right hand thread; section 17c, which is situated between the bearings, has a left hand threaded half adjacent bearing 21 and a right hand threaded half adjacent bearing 22.

Cutter screw conveyor 14 consists similarly of a strip 24, projections 25, spokes 26, boss 27 secured to a shaft 28. The two cutter screw conveyors are identical except that the direction of the threads is reversed.

The shaft of motor 15 is provided with a pulley or sprocket wheel 29 which drives a pulley or sprocket wheel 30 on shaft 20 through a belt or chain 31. The shaft on motor 15 is also provided with a gear wheel 32, which drives a gear wheel 33 on a shaft 34. A pulley or sprocket wheel 35 on shaft 34 drives a pulley or sprocket wheel 36 on shaft 28 through a belt or chain 37. Thus shafts 20 and 28 rotate in opposite directions.

The nozzle 16 has a flange 38 for connection to a suction hose 39. The suction hose is supported by a wire 40. The nozzle 16 is mounted axially adjustable in a guide 41. The nozzle 16 is provided with a screw threaded stud 42 which projects through a vertical slot 43 in the guide 41. Stud 42 is provided with a wing nut 44 to enable the nozzle to be locked in position.

The nozzle is situated symmetrically with respect to the cutter screw conveyors 13 and 14. Consequently, in view of the configuration of the cutter screw conveyors and the fact that they rotate in opposite directions, the cutter screw conveyors not only loosen the copra, but transport the loosened copra to the place between the bearings where the right hand and left hand threads of each cutter screw conveyor meet. The nozzle 16 is situated above this place and, as both cutter screw conveyors rotate towards the nozzle (see Fig. 2) transportation of copra to the nozzle is very efficient.

A further advantage of the symmetrical location of the nozzle with respect to the cutter screw conveyors is that the copra is conveyed in a symmetrical manner towards the nozzle so that the copra will be evenly distributed over the cross section of the nozzle opening. This results in a smaller air consumption.

In operation, the unit 6 is lowered by means of the wire 11 until the cutter rests upon the cargo. After the suction fan (not shown) has been started, the motor 15 is started and the cutter screw conveyors 13 and 14 will loosen the copra and transport them to the opening of the nozzle 16, where they will be sucked up. The loosening operation is greatly facilitated by the projections 23 and 25. By means of the wires 7 and 8 etc. the unit 6 is pulled along the surface of the cargo and peels off a strip. The unit is pulled forwards and backwards under gradual vertical displacement so that the cargo is peeled off in layers and unloaded.

The cutter screw conveyors shown schematically in Fig. 5 and Fig. 6 differ from those shown in Figs. 1–4 in that, instead of being in the form of a helical strip supported on spokes, each consists of a plurality of helically inclined arch shaped plates 45. Each plate 45 is secured to the shaft or boss by means of a spoke 46. The other cutter screw conveyor consists similarly of helically inclined arch shaped plates 47 secured to its shaft or boss by means of spokes 48. The cutter screw conveyors shown in these figures operate in a manner similar to the cutter screw conveyors shown in Figs. 1–4 so that on their rotation the material is transported towards the nozzle 16.

I claim:

1. A pneumatic unloading device comprising a pair of parallelly disposed cutter screw conveyors, each cutter screw conveyor having a left hand threaded part and a right hand threaded part of substantially the same length, the left hand threaded part of each cutter screw conveyor being adjacent to the right hand threaded part of the other cutter screw conveyor, means for rotating the cutter screw conveyors in opposite directions and a suction nozzle having a material inlet opening disposed substantially over the centre of the area covered by the cutter screw conveyors, so that on rotation of the cutter screw conveyors the material to be unloaded is transported towards the nozzle opening.

2. A pneumatic unloading device as claimed in claim 1 in which the position of the suction nozzle is adjustable towards and away from the cutter screw conveyors.

3. A pneumatic unloading device as claimed in claim 1 in which each cutter screw conveyor is in the form of a helical strip of material secured by means of spokes to a shaft or a boss.

4. A pneumatic unloading device as claimed in claim 1 in which the cutter screw conveyor is in the form of a plurality of helically inclined arch shaped plates secured by means of spokes to a shaft or boss.

5. A pneumatic unloading device comprising a pair of parallelly disposed cutter screw conveyors of substantially equal length, each cutter screw conveyor having a left hand threaded part and a right hand threaded part of substantially the same length, the left hand threaded part of each cutter screw conveyor being adjacent to the right hand threaded part of the other cutter screw conveyor, means for rotating the cutter screw conveyors in opposite directions and a suction nozzle having a material inlet opening which is symmetrically disposed with respect to the pair of cutter screw conveyors, so that on rotation of the cutter screw conveyors the material to be unloaded is transported towards the nozzle opening.

6. A pneumatic unloading device comprising a pair of parallelly disposed similar cutter screw conveyors, each cutter screw conveyor having a left hand threaded part and a right hand threaded part of substantially the same length, the left hand threaded part of one cutter screw conveyor being adjacent to the right hand threaded part of the other cutter screw conveyor and each cutter screw conveyor being in the form of a helical strip of material secured by means of spokes to a shaft or boss, the periphery of said strip of material being provided with projections, means for rotating the cutter screw conveyors in opposite directions, and a suction nozzle having a material inlet opening symmetrically disposed with respect to the pair of cutter screw conveyors so that on rotation of the cutter screw conveyors material to be unloaded is transported towards the nozzle opening.

7. A pneumatic unloading device as claimed in claim 5 in which the peripheries of the cutter screw conveyors are provided with projections.

References Cited in the file of this patent

UNITED STATES PATENTS

| | | |
|---|---|---|
| 2,583,648 | Hensley | Jan. 29, 1952 |
| 2,663,594 | Dennick | Dec. 22, 1953 |
| 2,719,058 | Van Dusen | Sept. 27, 1955 |